(12) United States Patent
Sack

(10) Patent No.: US 8,001,265 B2
(45) Date of Patent: Aug. 16, 2011

(54) METHOD FOR TRANSMITTING A USER DATA RECORD TO A USER STATION

(75) Inventor: Michael Sack, Greding (DE)

(73) Assignee: Brands & Products IPR-Holding GmbH & Co. KG, Munich (DE)

(*) Notice: Subject to any disclaimer, the term of this patent is extended or adjusted under 35 U.S.C. 154(b) by 934 days.

(21) Appl. No.: 10/545,477

(22) PCT Filed: Feb. 13, 2004

(86) PCT No.: PCT/DE2004/000274
§ 371 (c)(1),
(2), (4) Date: Aug. 15, 2005

(87) PCT Pub. No.: WO2004/073255
PCT Pub. Date: Aug. 26, 2004

(65) Prior Publication Data
US 2006/0168248 A1    Jul. 27, 2006

(30) Foreign Application Priority Data

Feb. 14, 2003  (DE) .................................. 103 06 268

(51) Int. Cl.
*G06F 15/16* (2006.01)
(52) U.S. Cl. ....................................................... 709/236
(58) Field of Classification Search .................. 709/203, 709/217–219, 236; 725/11
See application file for complete search history.

(56) References Cited

U.S. PATENT DOCUMENTS

| 5,892,535 | A | * | 4/1999 | Allen et al. ...................... 725/36 |
| 5,959,989 | A |   | 9/1999 | Gleeson et al. |
| 6,154,772 | A | * | 11/2000 | Dunn et al. ...................... 725/114 |
| 6,307,837 | B1 | * | 10/2001 | Ichikawa et al. .............. 370/230 |
| 6,747,998 | B1 | * | 6/2004 | Enari ............................. 370/516 |
| 6,859,501 | B1 | * | 2/2005 | Zimmermann et al. ....... 375/260 |
| 6,986,159 | B1 | * | 1/2006 | Shimoji et al. ................ 725/142 |
| 2001/0054115 | A1 |   | 12/2001 | Ferguson et al. |

FOREIGN PATENT DOCUMENTS

| EP | 1 233 576 A2 | 8/2002 |
| WO | WO 03/007635 A1 | 1/2003 |

* cited by examiner

*Primary Examiner* — George C Neurauter, Jr.
(74) *Attorney, Agent, or Firm* — Kriegsman & Kriegsman

(57) ABSTRACT

A method for transmission of a user data record to a user station. The method features the following steps: (i) transmitting the user data record as a broadcast data record via a network system including at least two networks capable of data transmission, of which at least one is designed as a broadcast network in which a network identification of the broadcast network used for transmission is added to the broadcast data record prior to transmission in the respective broadcast network; (ii) extracting at least the network identification last added to the broadcast data record at reception of the last used broadcast data records from this broadcast data record; and (iii) forwarding at least the last network identification to the user station for allowance of at least the last network identification in connection with the user data record usage.

29 Claims, 15 Drawing Sheets

METHOD FOR TRANSMITTING A USER DATA RECORD TO A USER STATION

Figure 1:
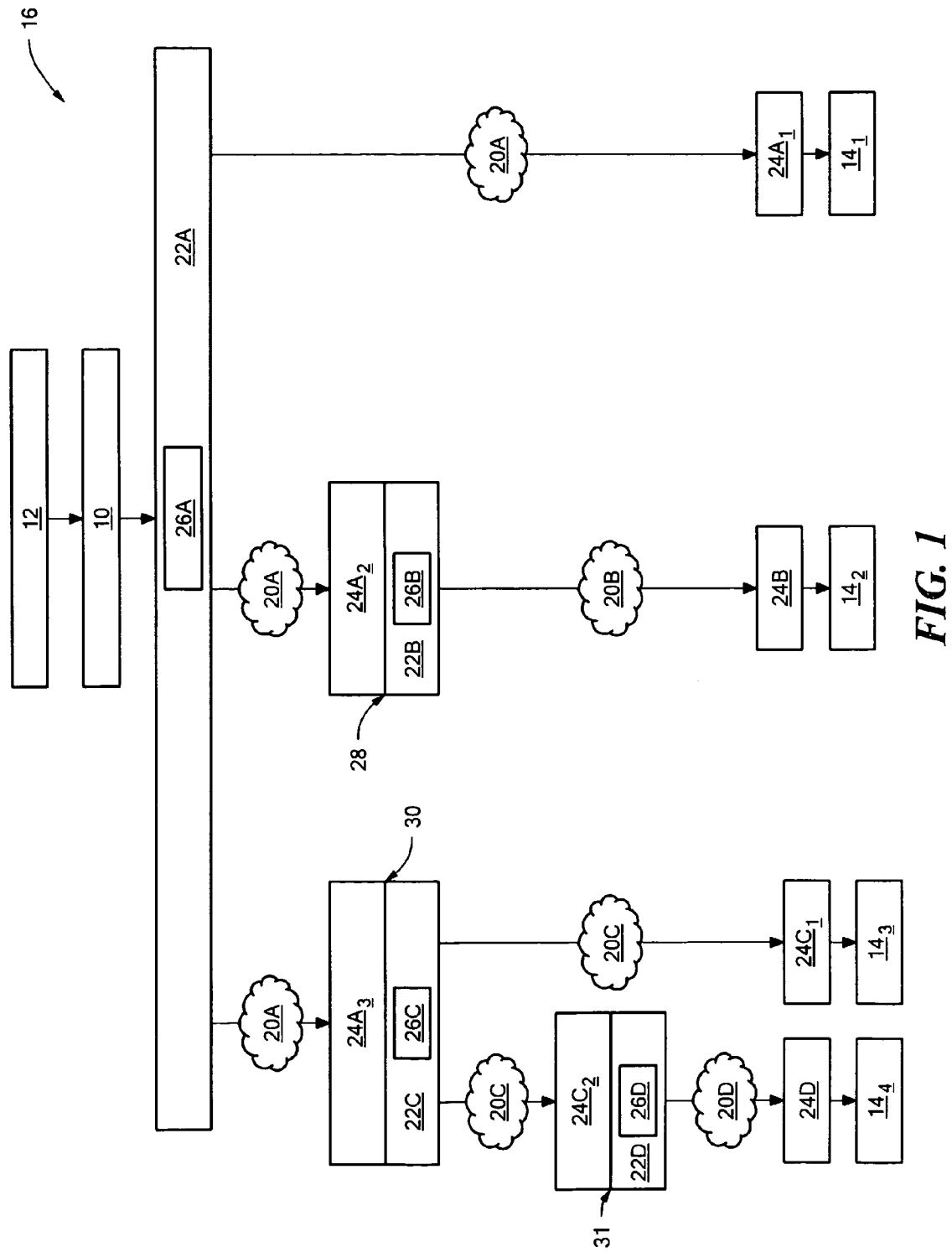

The present invention relates to a method for transmitting a user data record to a user station through a network system including broadcast networks.

It is a general problem of broadcast networks that it is not possible to identify a user station due to the uni-directional operation of broadcast networks.

Hence network systems including broadcast networks can not be used in all cases, where the identification via which broadcast network a user data record has been transmitted, is practical or essential and applications, for which such identification is practical or essential, can not be used at all or in a limited way only in network systems including broadcast networks respectively.

With the so called convergence of media, that is the coalescence of different appliances such as TV and PC and as a consequence thereof the meeting of digital content and user data, new business models arise. These are also highly affected by the merger of different network systems since the traditional computer networks such as the Internet become a matter of interest for transmission of digital media such as video and audio due to increasing transmission performance and, contrariwise, broadcast networks are used for the transmission of data and user data respectively in digital formats due to the low transmission cost. Generally the distribution of user data is carried out not via a single network but rather more via a system of networks stringed together. In doing so it can be a matter of both broadcast networks and bi-directional networks.

For example user data is transmitted via a bi-directional network to a broadcast transmitting station and from there broadcasted over satellite. Utilizing a transition station this data can be broadcasted in a cable TV network to arrive in a user station though another bi-directional network eventually. This user station transmits information related to the said user data via a third bi-directional network to a station for analysis.

Hitherto existing business models are highly related to the network system in use and therefore different for computer networks, which are bi-directional, than for uni-directional broadcast networks. In particular this regards path information in a computer network, which for instance is used to split the proceeds gained with a user data record between various service providers involved in the transmission. Due to the uni-directionality of broadcast networks such business models can not be mapped straightforward as long no methods exist enabling the identification of such paths in networks comprising at least one broadcast network.

It is, therefore, an object of the present invention to provide a method to transmit a user data record of the kind described above to identify the use of at least the last broadcast network in the network system.

The task is solved by the method according the independent claim 1. Further benefits, attributes, details, aspects, and effects of the invention result from sub-claims, the description, and the drawings.

In accordance with the present invention the task is solved by a method to transmit a user data record to a user station with the following steps:

Transmission of the user data record as a broadcast data record via a network system comprising two networks capable of data transmission at least, where one network at least is constructed as broadcast network, where in the respective broadcast network a network identification of the broadcast network used for transmission is added to the broadcast data record either as an extension to or as substitution of existing identification before transmission, Extract of at least the network identification last attached to the broadcast data record at reception of the broadcast data record last used from this broadcast data record, and Forwarding of at least the last network identification to the user station in allowance of at least the last network identification in connection with the use of the user data record.

The invention is not limited to a certain kind of and a certain number of networks within a network system. For example, but not exclusively, the network system can comprise at least two sequential or parallel broadcast networks for data transmission. In this case 'parallel' means generally that data can utilize the one or the other data path. Some not exclusive examples of useful architectures will be explained more detailed in the course of the description.

The advantage of the solution in accordance with the present invention can be seen therein, that it is possible through extraction and forwarding of at least the network identification last added to the broadcast data record due to the knowledge of the architecture of the network system to identify the broadcast network used for the transmission of the user data record and to consider this in connection with to the use of user data record.

According to the present invention a broadcast data record must be comprehended as a data record comprising the information content of the user data record.

The network identification can be integrated in or assigned to the broadcast data record.

Further the broadcast data record results from the totality of the information assigned to each other not depending whether it is transmitted actually via the same channel or via a variety of channels of the broadcast network.

A particular advantageous exemplary embodiment of the method in accordance with the present invention provides, that the allowance of the last network identification with regard to the use of the user data record incorporates the comparison of the last network identification with a network identification predetermined to the user station for decision on the release of the user data record for the user station.

In doing so the possibility of a pre-selection through the release of the user data record exists.

The decision on the release of the user data record can be carried out in different ways.

One alternative provides that the decision on the release of the user data record is than positive, when the last network identification is identical to the predetermined network identification.

The realization of the decision on the release of the user data record can be carried out in different ways.

One advantageous solution provides that the decision on the release of the user data record is carried out automatically by a filter function inserted before access to the user data record.

With regard to the transmission of the predetermined network identification to the user station various ways can be considered.

One alternative provides that the predetermined network identification is transmitted via the network system.

Another advantageous solution provides that the predetermined network identification is transmitted to the user station via a separate path.

With regard to the hitherto explanation of the solution in accordance with the present invention it was assumed, that at least the broadcast network used last for transmission of the broadcast data record can be identified. This is a minimum condition for the conception in hand.

Within the scope of a further embodiment of the solution in accordance with the present invention it is also conceivable, that in addition to the last network identification at least one other previous network identification is extracted from the broadcast data record and forwarded to the user station.

In this case the broadcast data record not only comprises the last network identification, but it can be built up in a way, that it also comprises preceding network identifications, that can be extracted at reception of the last used broadcast data record from this broadcast data record.

This solution is advantageous in all cases, in which the network system comprises a variety of paths via which the transmission of the user data record to a certain user station can be carried out, so that the extract of the network identification last added to the broadcast data record could not be sufficient to trace back the path of the user data record transmission.

Another advantageous embodiment of the solution in accordance with the present invention provides, that the network identification added to the broadcast data record allows at least one identification of a previously used broadcast network.

In this case the network identification is not only established in a way, that it only permits the identification of the broadcast network used by the broadcast data record with this network identification, but also concurrently permits information on preceding used broadcast networks, so that the extract of the network identification last added to the broadcast data record is sufficient in case of a variety of transmission paths to determine which of the variety of transmission paths was used.

So far no indications were made concerning the way of forwarding the last network identification to the user station. Thus an advantageous solution provides, that the forwarding of at least the last network identification to the user station comprises the transmission of that identification as discrete information.

In doing so a peculiar transmission path can be provided for the transmission of at least the last network identification to the user station.

However, a particular beneficial solution provides that the forwarding of at least the last network identification to the user station is carried out via a transmission path of the user data record.

Ditto no indications were made so far concerning the allowance of the last network identification in connection with the user data record.

A particular beneficial solution within the scope of the present invention provides, that the allowance of at least the last network identification in connection with the use of the user data record comprises a forwarding of at least the last network identification to a compilation station.

This solution in accordance with the present invention establishes the possibility, to identify in the compilation station via which broadcast network the user data record has been transmitted, because due to the structure of the network system the preceding used broadcast networks can be deduced from the last used broadcast network.

In particular the compilation station suites to ascertain the utilization of the broadcast networks of a network system.

It is especially beneficial, when the forwarding of at least the last network identification to the compilation station is carried out together with the usage information of the user station, given that in addition in the compiler indications on the usage of the user data record can also be recorded.

In doing so it is especially beneficial, when the usage information comprises information about the user data record.

Furthermore it is beneficial, when the usage information comprises information about the user.

The user information can be versatile.

A beneficial solution provides, that the user information comprises a user identification.

Alternatively or supplementary to the user information it is preferentially provided, that the user information comprises information about activities of the user in connection with the user data record.

The forwarding of at least the last network identification is preferentially carried out via a transmission path separated from the network system.

For instance such transmission path could be a telephone line or the Internet.

Concerning the mode of operation of the compilation station it is preferentially provided, that it analyzes the last network identification and the usage information conjointly.

Preferentially the compilation station is designed in a way that at least the last network information is forwarded with at least parts of the usage information, where for instance the forwarding is carried out for billing purposes.

Furthermore it is beneficial concerning the disposition of the compilation station, when it serves simultaneously to communicate with the user station with regard to the authorization of the user data record.

For instance the authorization is carried out in a way, that a key is made available for the decipherment of the user data record transmitted enciphered to the user station.

Furthermore it is preferentially provided, that simultaneously with the access to the user data record or simultaneously with the transfer of the key for decipherment of the enciphered user data record the owner of the user station is billed for user data record usage.

Another embodiment provides a 'virtual' network in the form of transfer of the user data record from a receiver station to a user station via a physical medium. In this case a unambiguous identification of the output device of the receiver station can be regarded as network identification, such as, but not exclusively, a disk drive or an optical drive of the receiver station.

Furthermore it is preferentially provided to draw on at least the last network identification transmitted with the user data record as criterion for user data record forwarding in a network transition station when transmitting via several networks, under it at least one broadcast network. Two identical user data records, but differing at least in the last network identification and therefore the transmission path could such be forwarded by the transition station via diverse paths.

This can be particularly beneficial, when a provider transmits a specific user data record with predetermined forwarding rules via a network comprising at least one broadcast network, and a second provider transmits the same user data record with different forwarding rules via a different network to the same compilation station. In this case in a certain embodiment of the present invention the transmitted network identification can be utilized as criterion for forwarding to a user station for instance via a local network or a virtual network as described above, i.e. by using a physical medium.

In another embodiment the allowance of the thitherto last network identification (NID D1 respectively NID D2) can be used by the respective downstream receiver station for identification on the compilation of the broadcast data record for forwarding into different networks of the network system and a transmission to the network associated with the network transition station subject to it, where the dependency can be pre-defined.

It can also be provided, that at least the thitherto last network identification (NID D1 respectively NID D2) is used for identification in a network transition station for transfer into different networks of the network system, that begin in that network transition station, a transfer into the appropriate network is subject to it, where the dependency can be pre-defined.

Preferentially at least one network can be a matter of bi-directional network, in particular a network in accordance with the TCP/IP standard.

Beneficially the transmission path can be a matter of a network according the TCP/IP standard.

Beneficially at least one broadcast network is a matter of a digital broadcast network. Particularly preferred at least one broadcast network can be a matter of a digital broadcast network in accordance with the DVB standard.

In another embodiment a participant's receiver station and a participant's user station can be two physically separated appliances, then not connected to each other via a network, where the user data record is transferred via a memory medium and interface in the receiver station and in the user station intended therefore.

In doing so the memory medium can for instance be a matter of flash memory or as the case may be.

In doing so the interface can for instance be a matter of USB interface or as the case may be.

Further features and benefits of the invention are subject of the following description as well as the drawings of some of the embodiments in accordance with the present invention.

Figure 2:
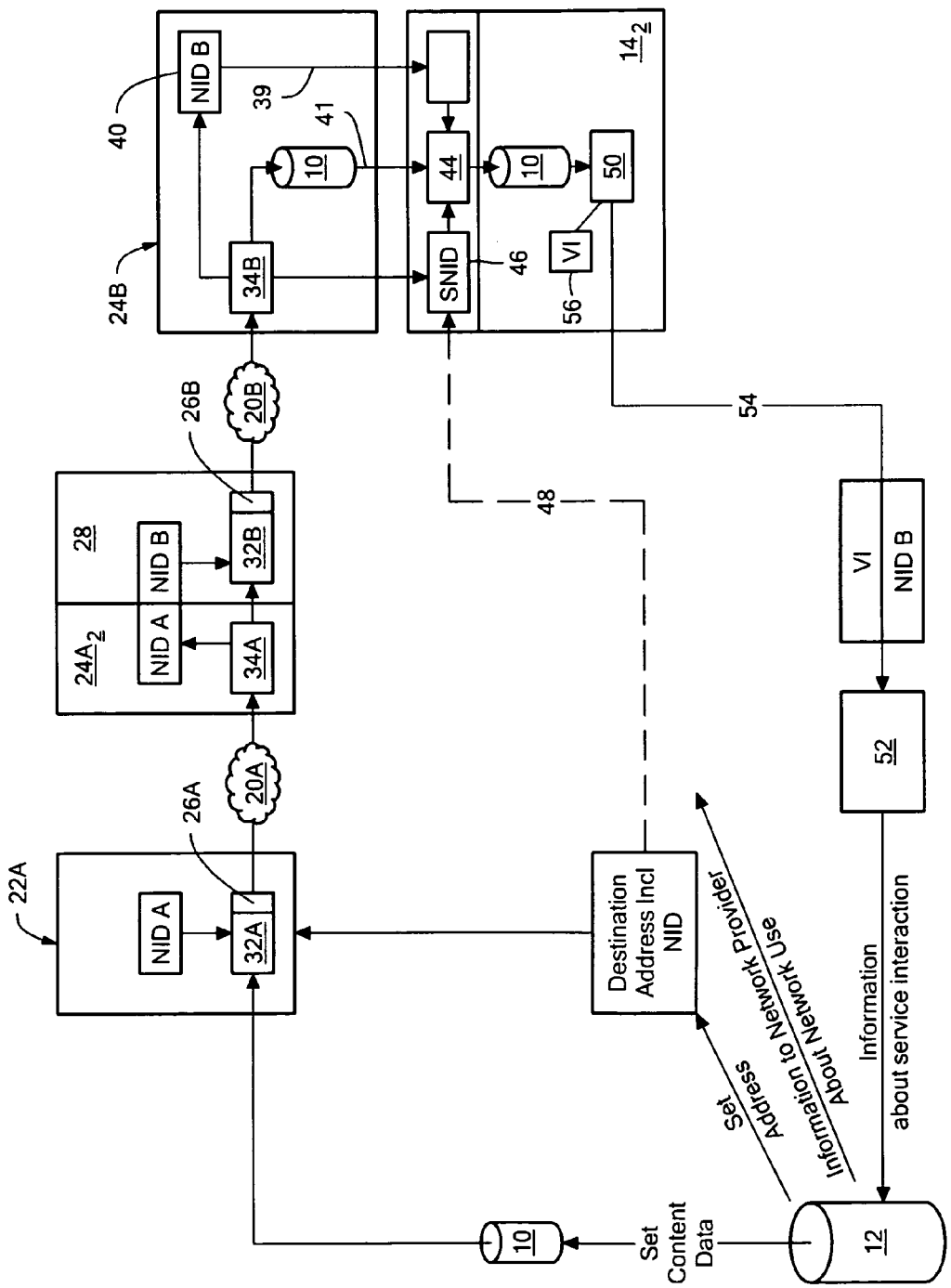
Figure 3:
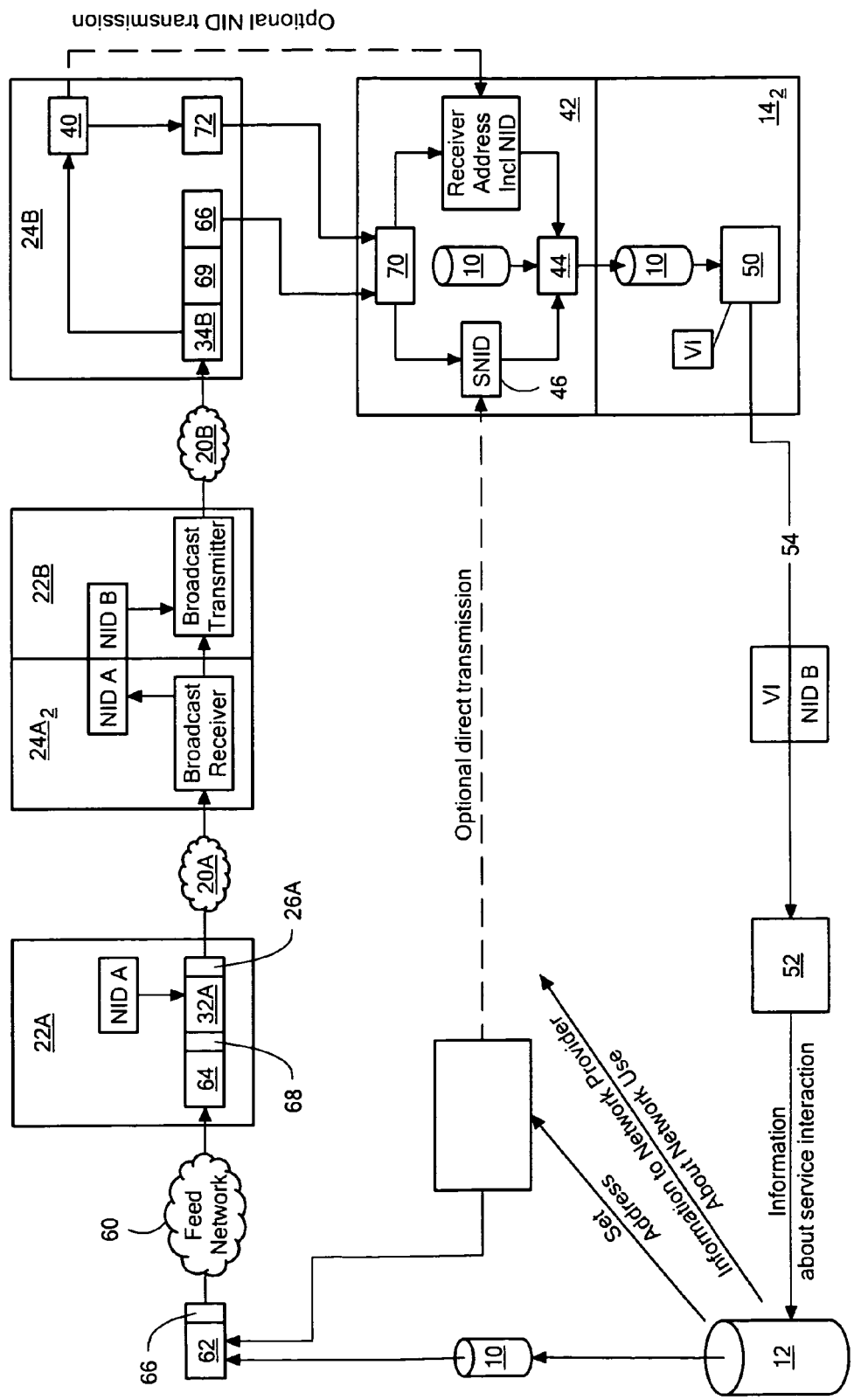
Figure 4:
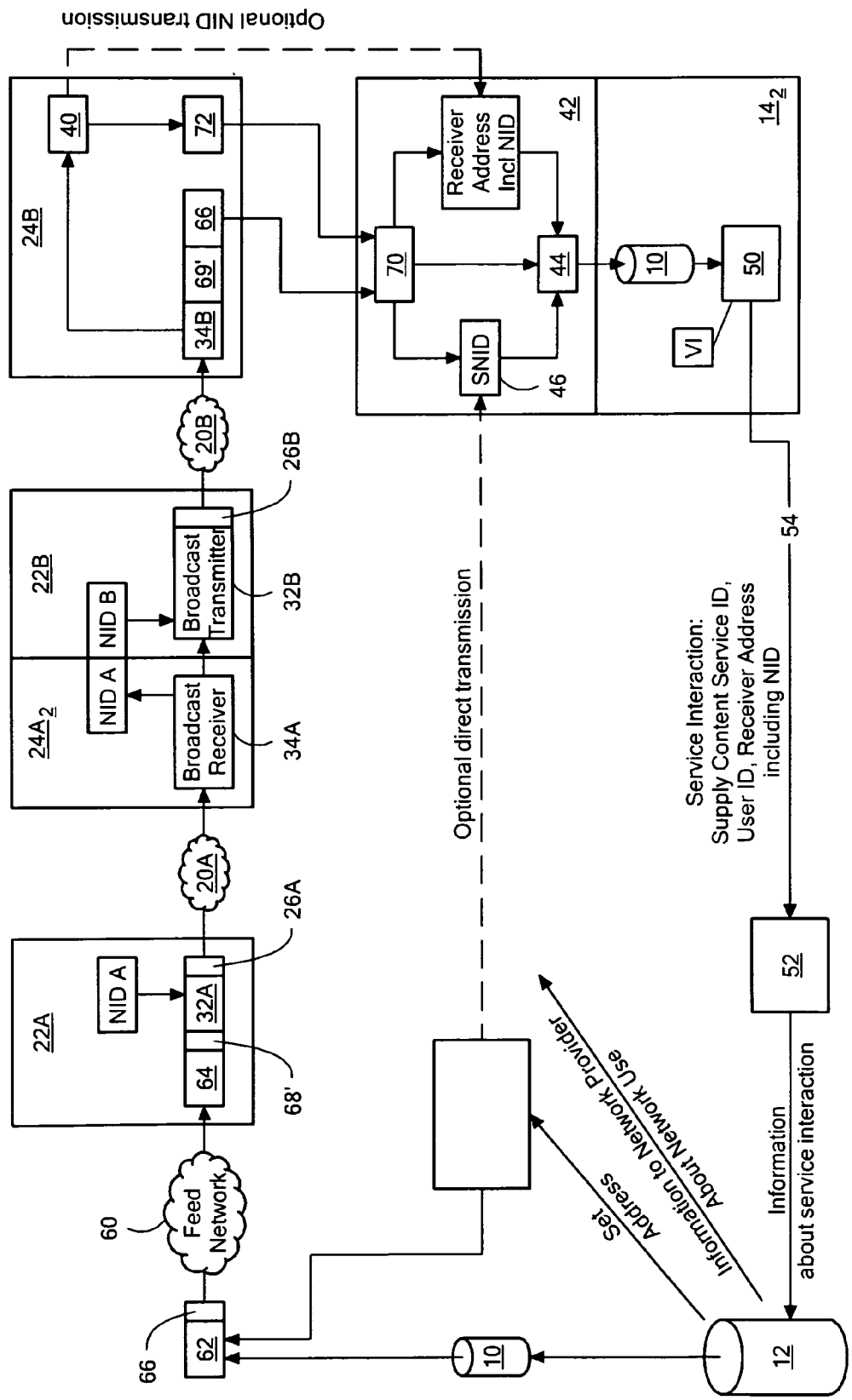
Figure 5:
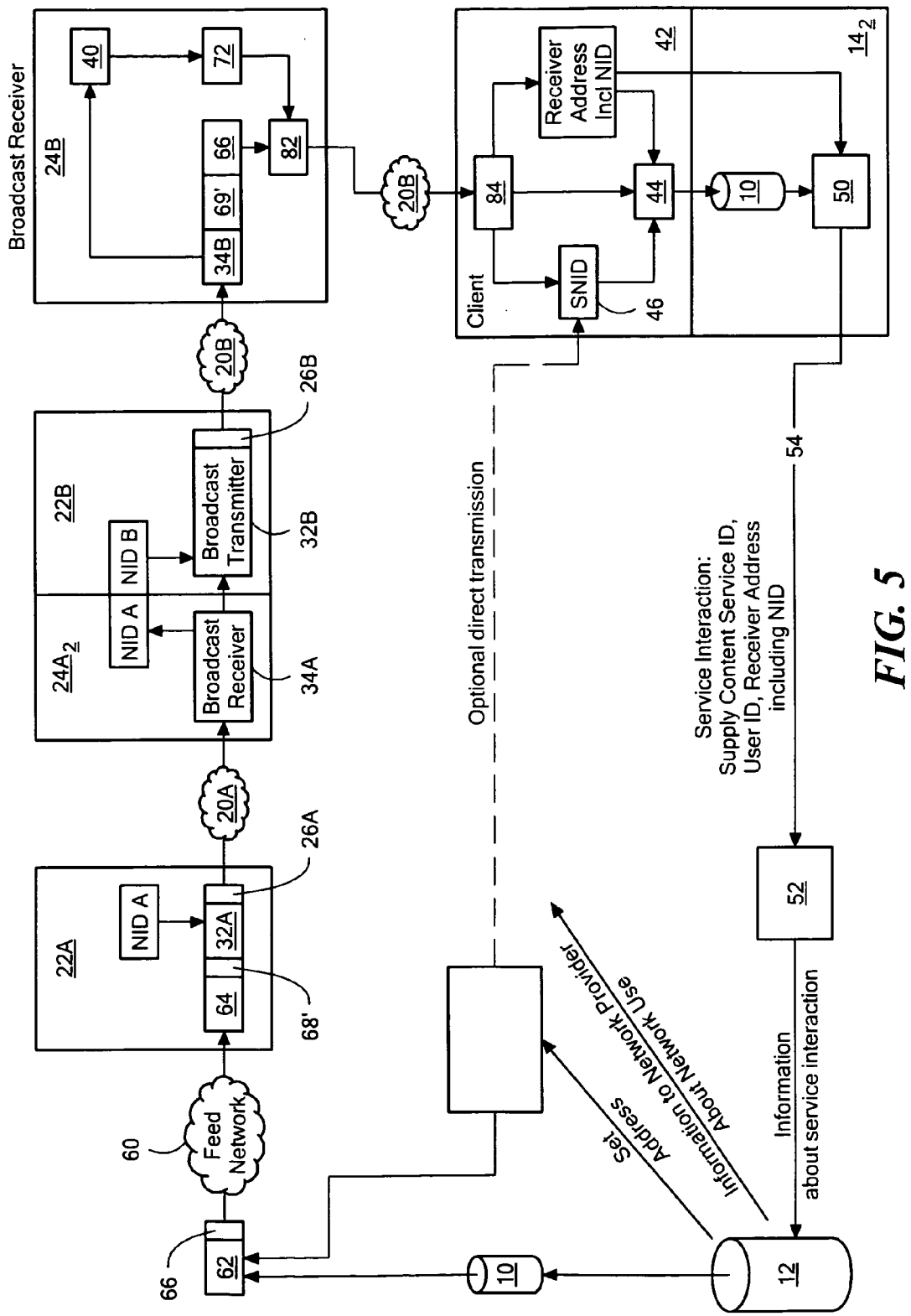
Figure 6:
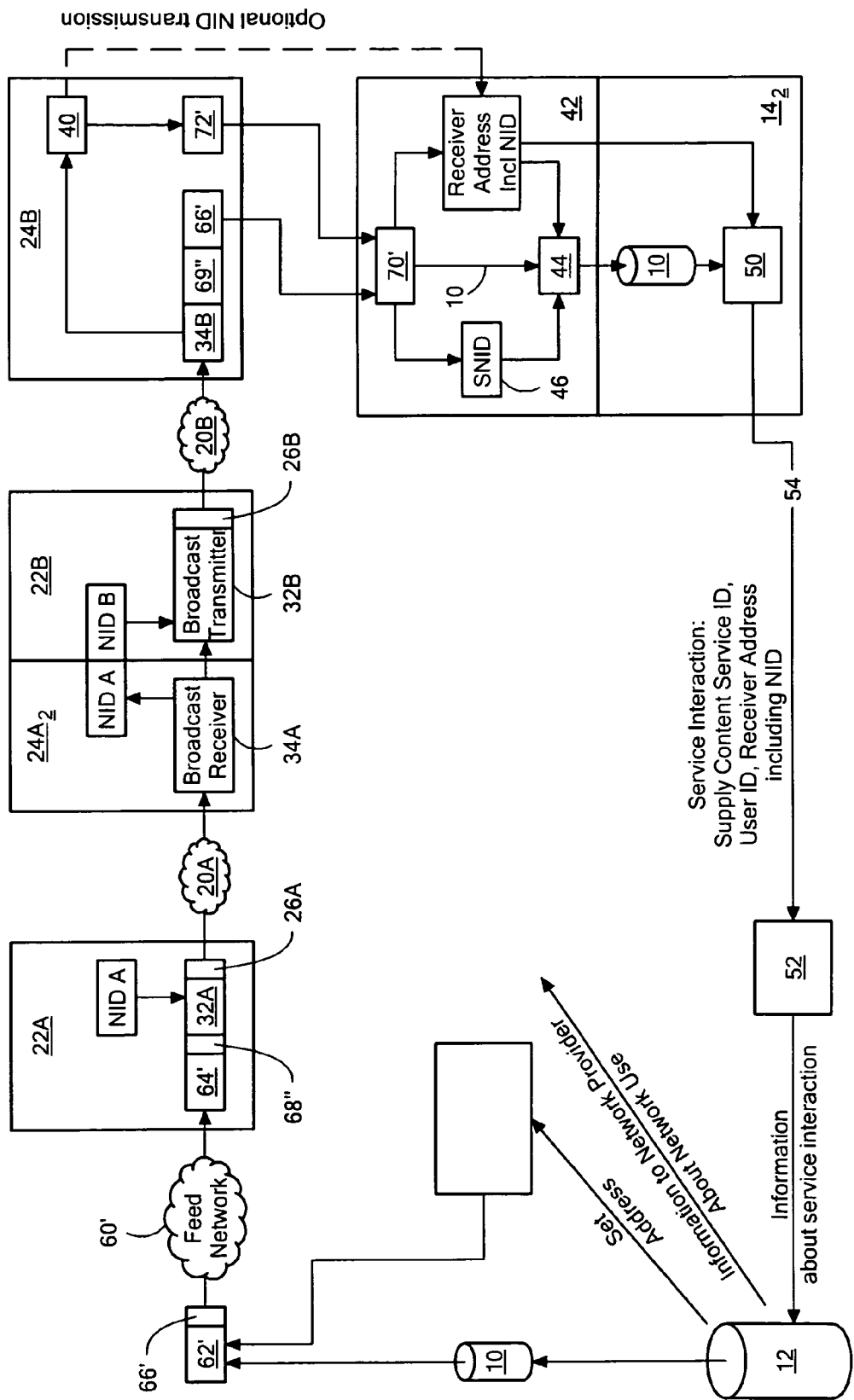
Figure 7:
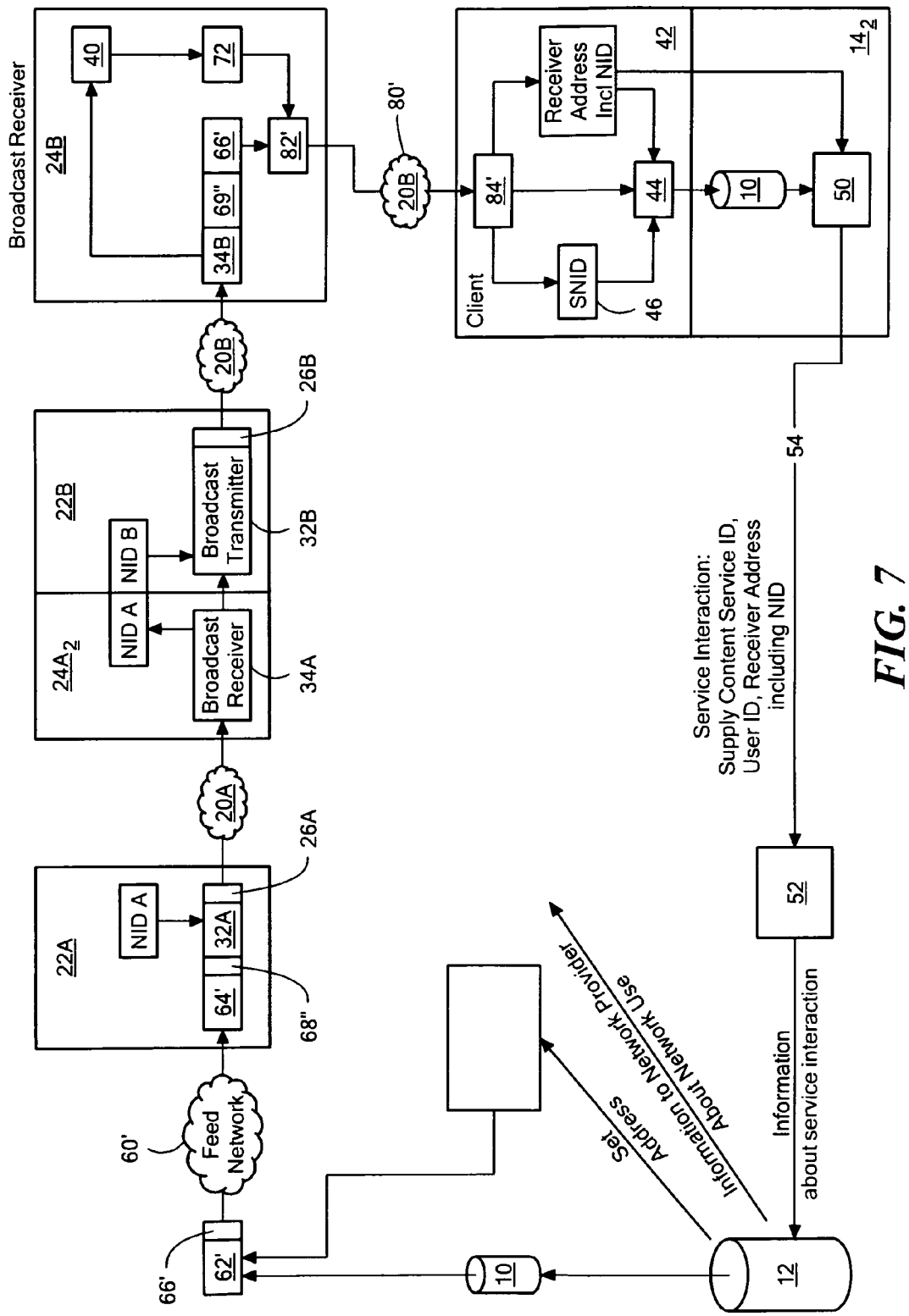
Figure 8:
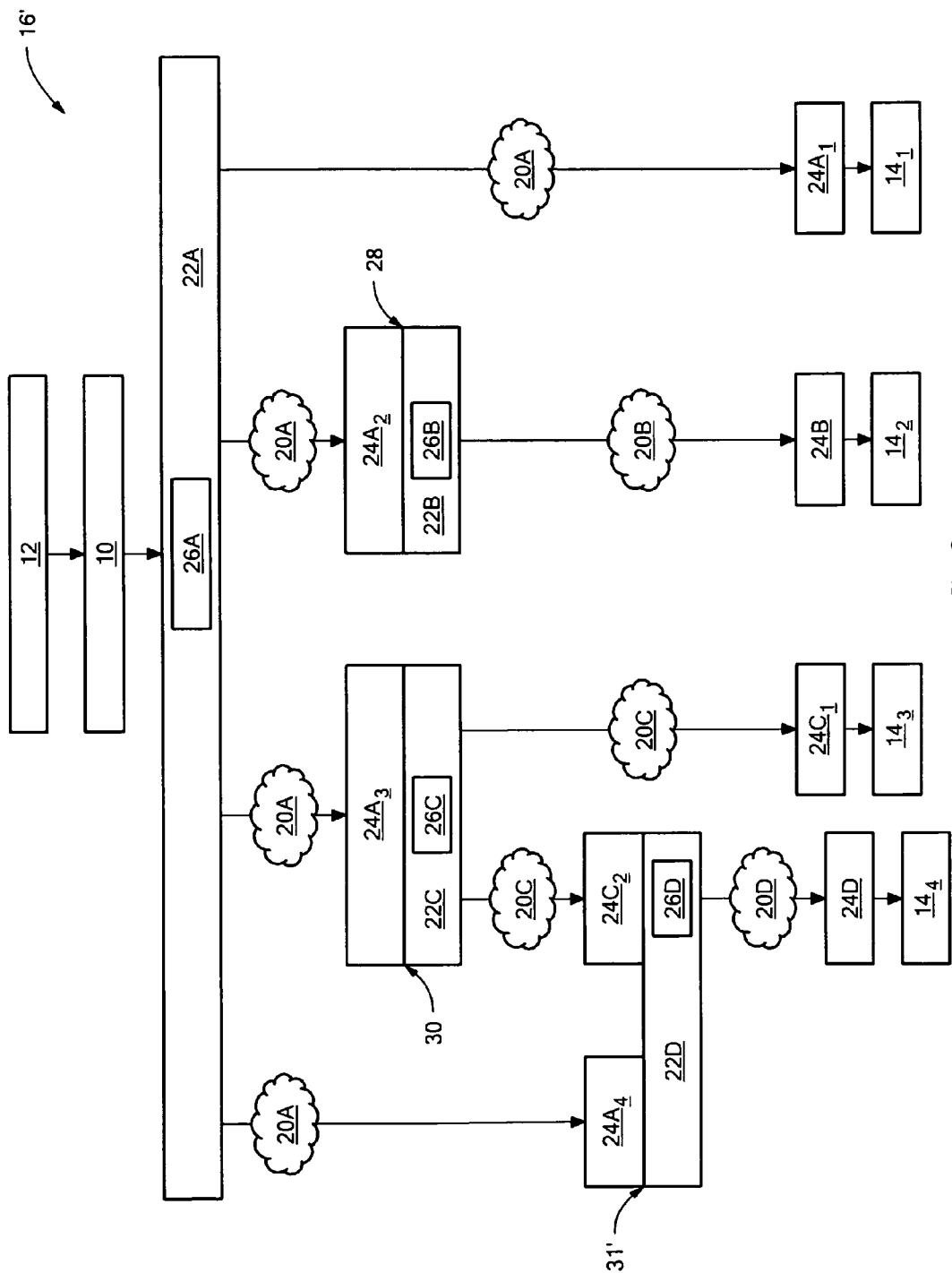
Figure 9:
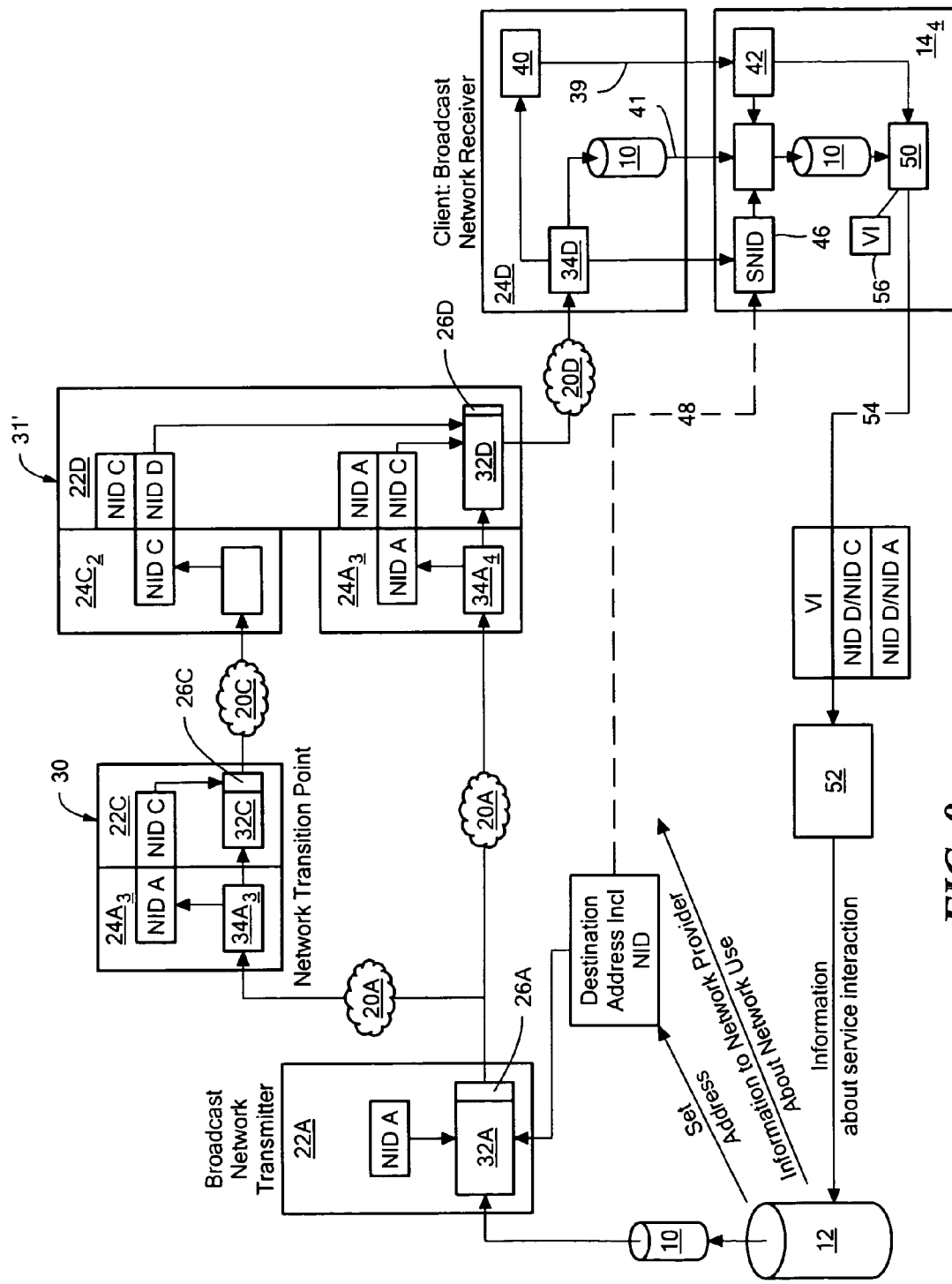
Figure 10:
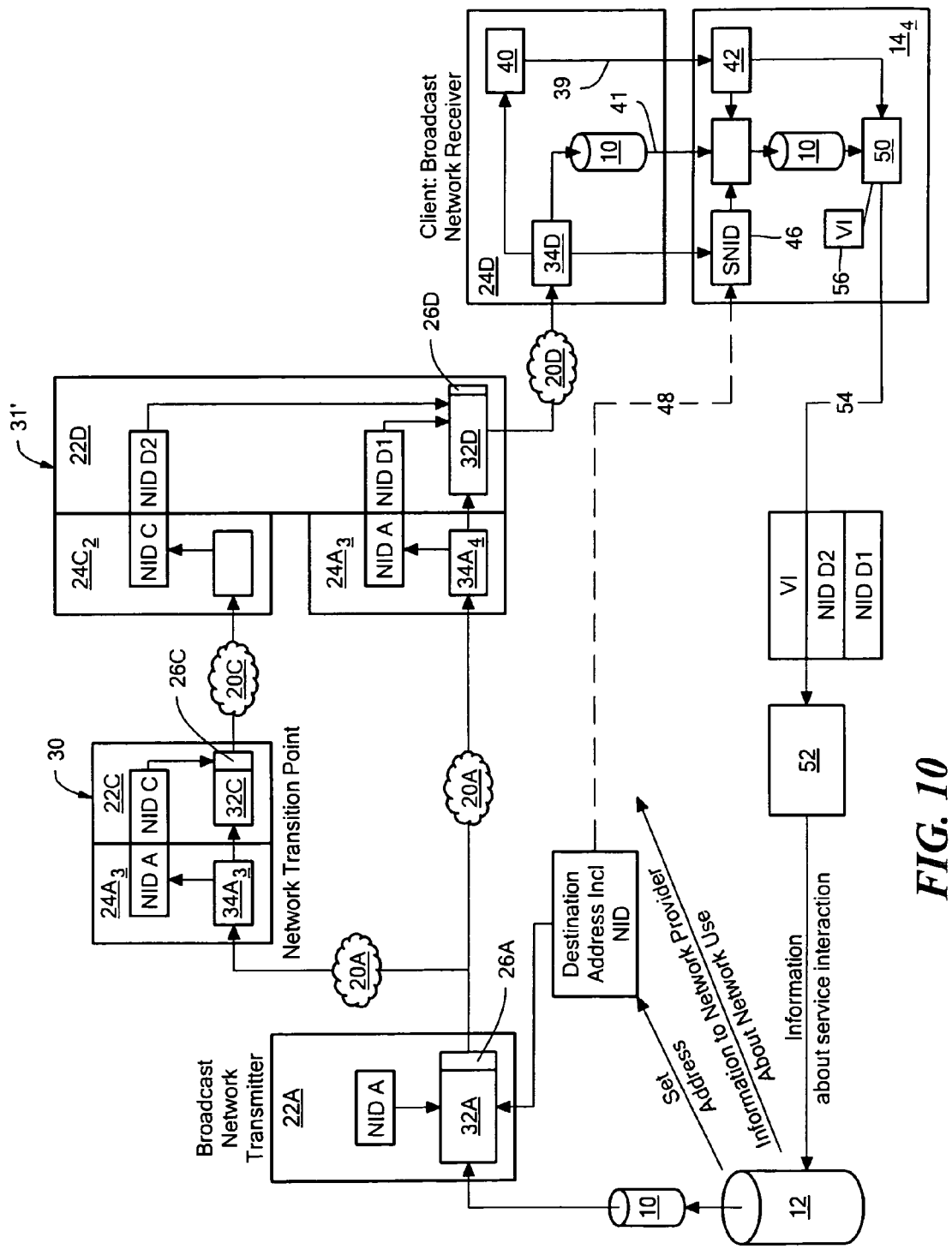
Figure 11:
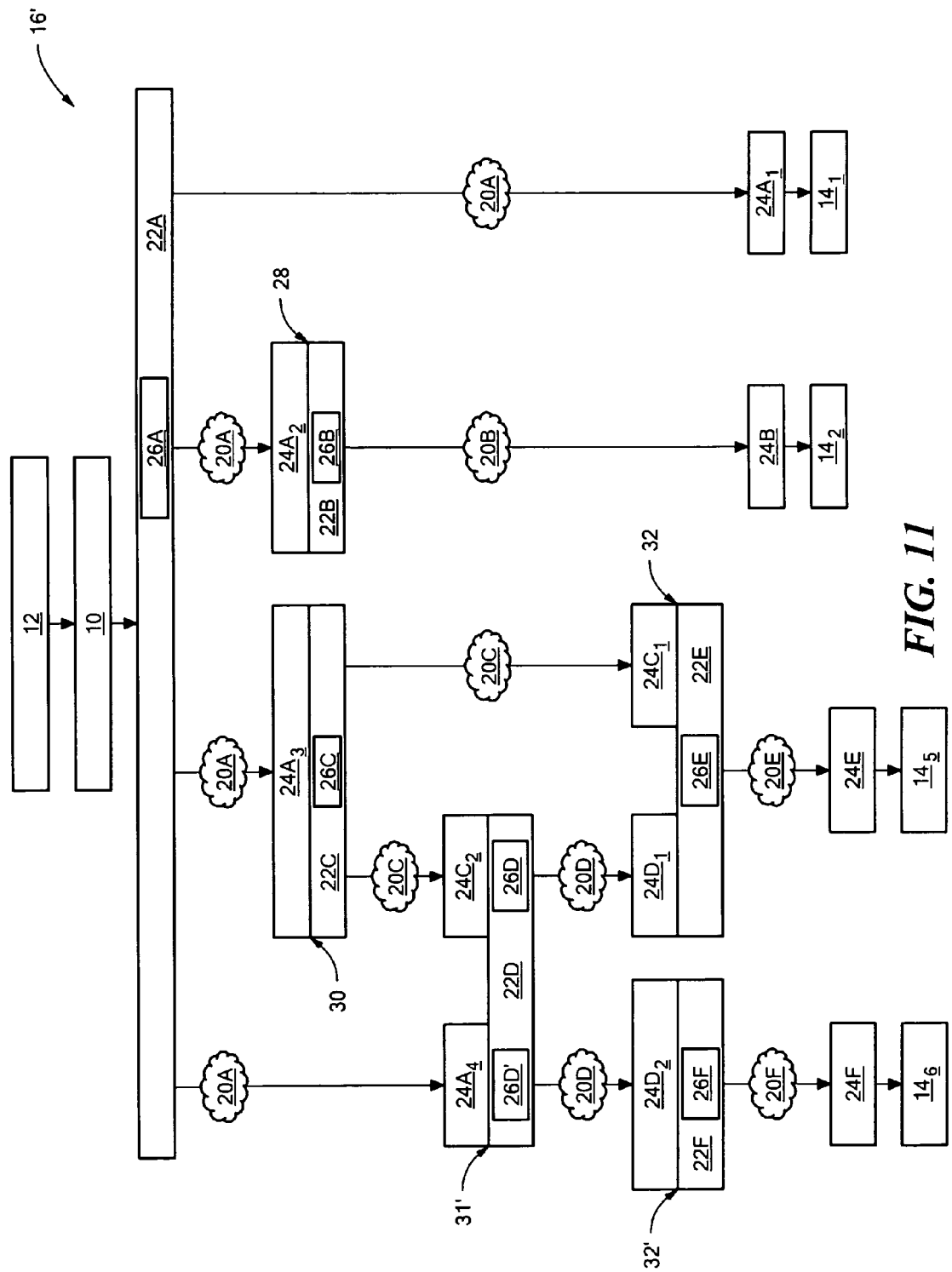
Figure 12:
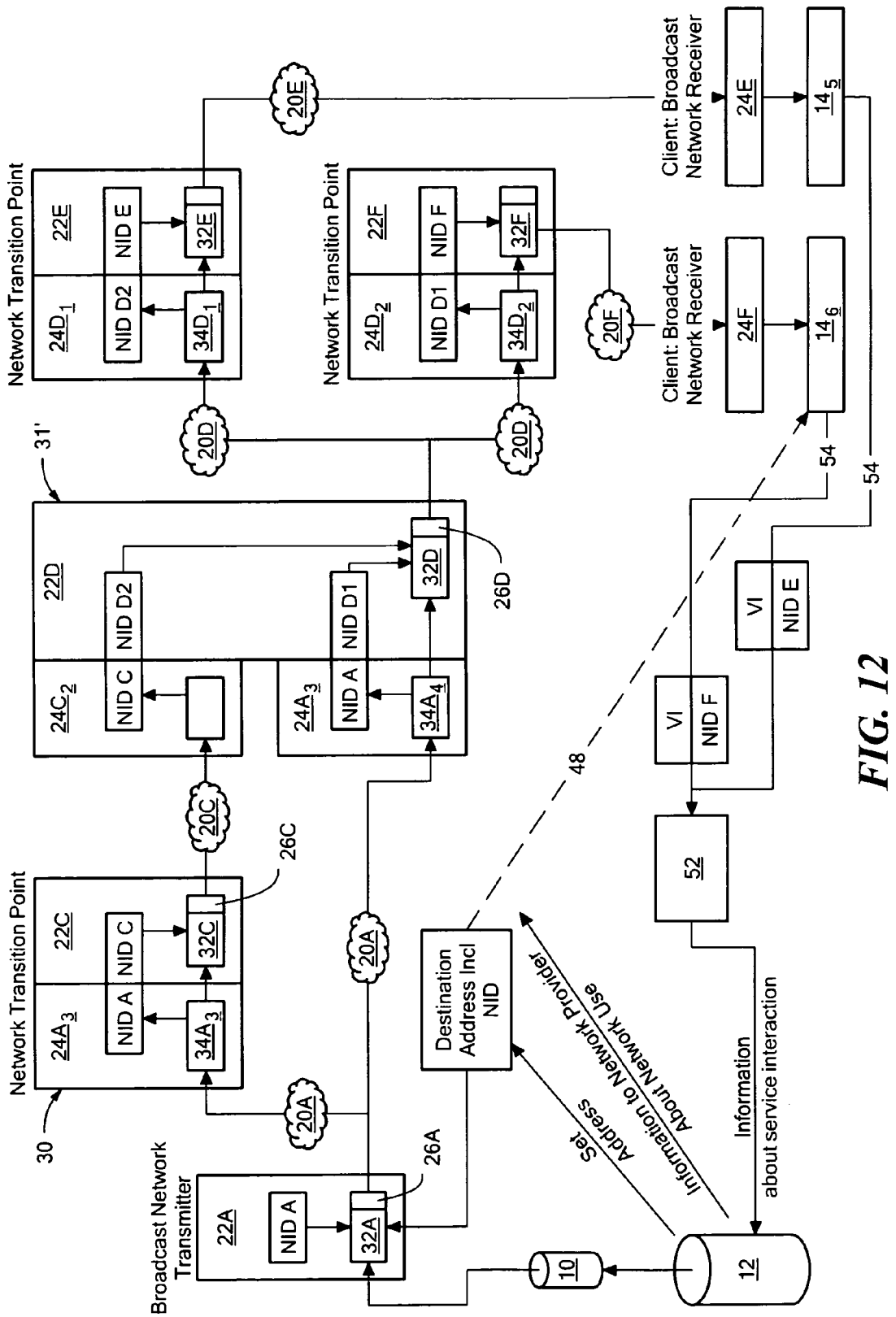
Figure 13:
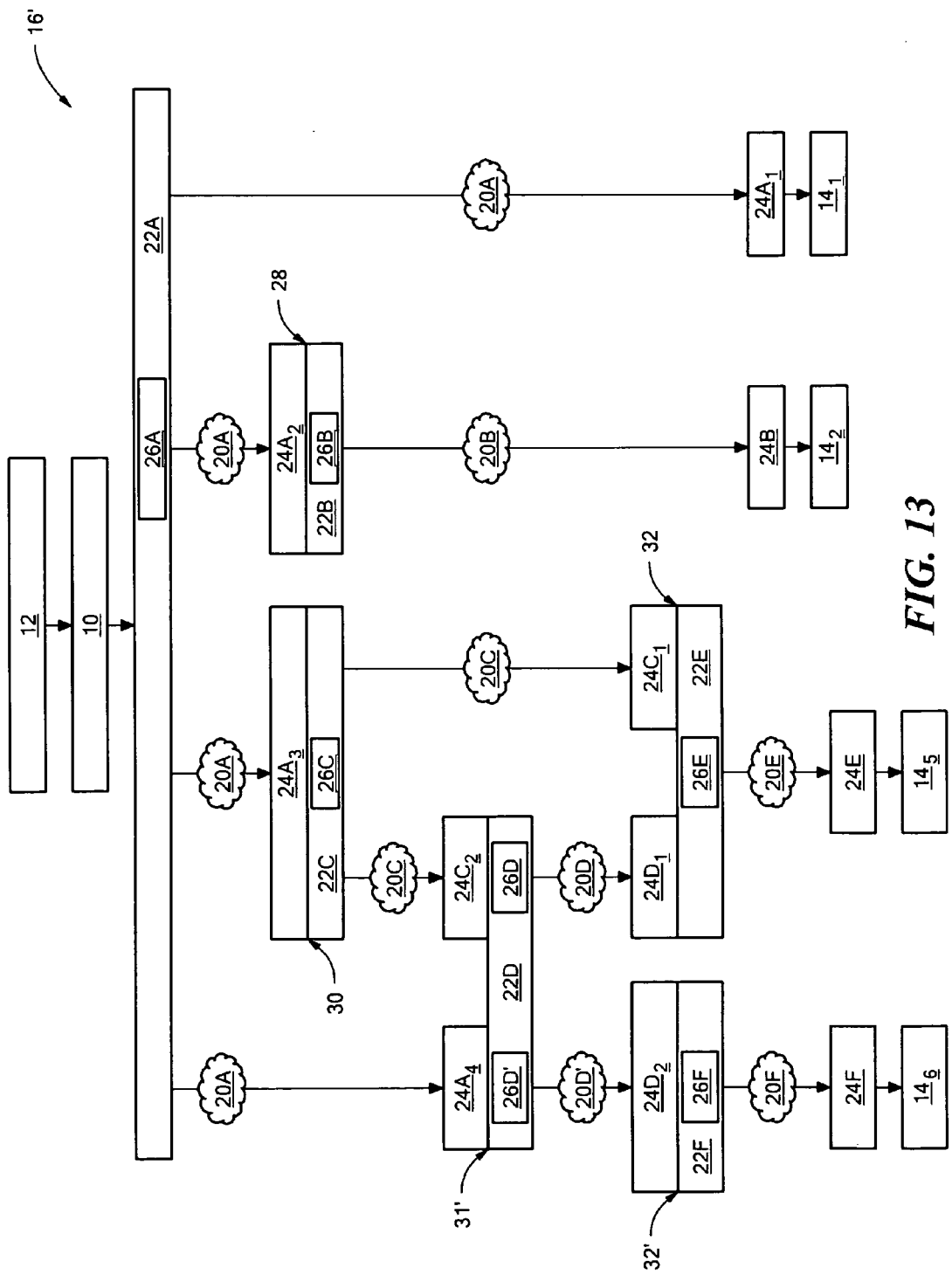
Figure 14:
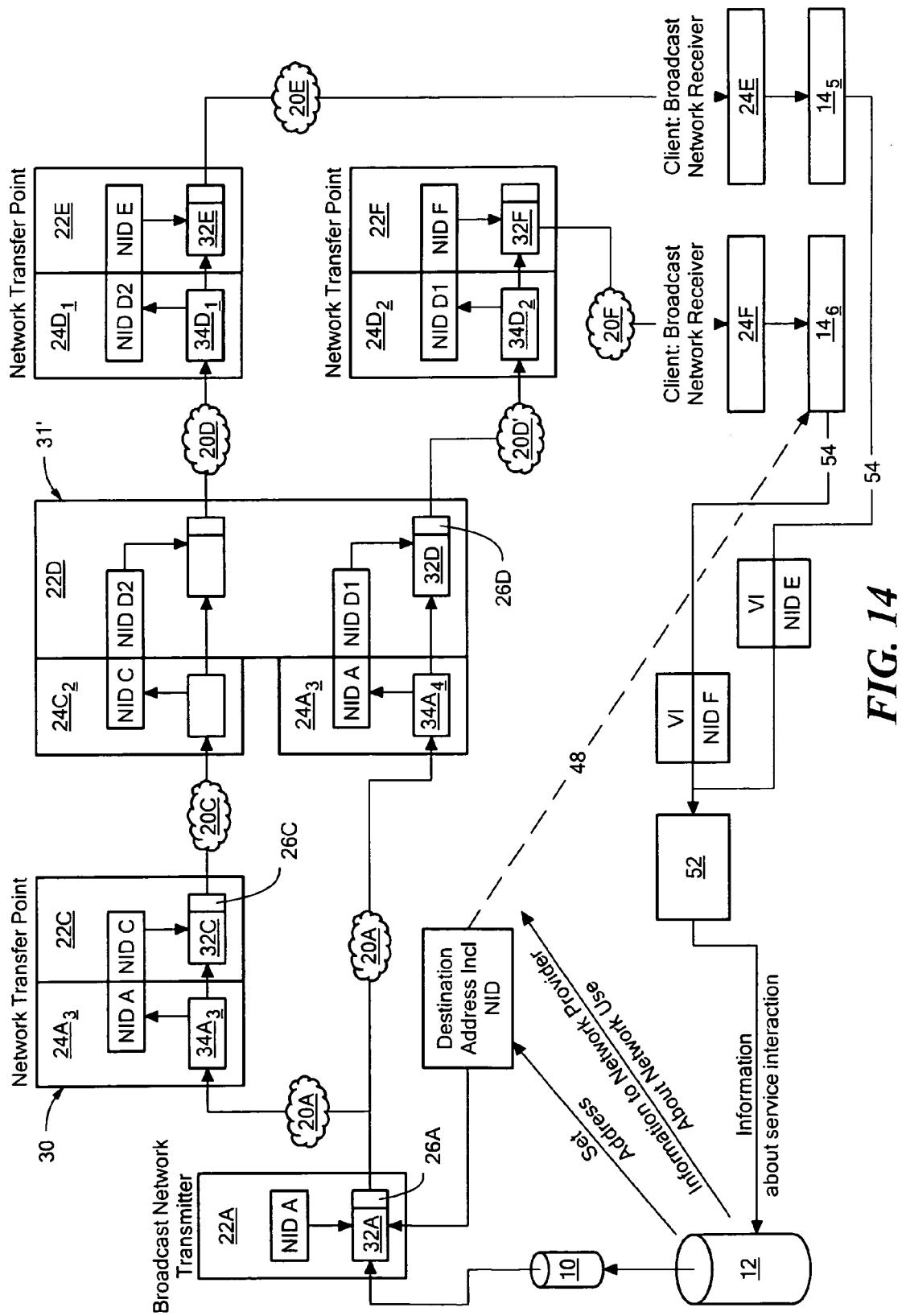
Figure 15:
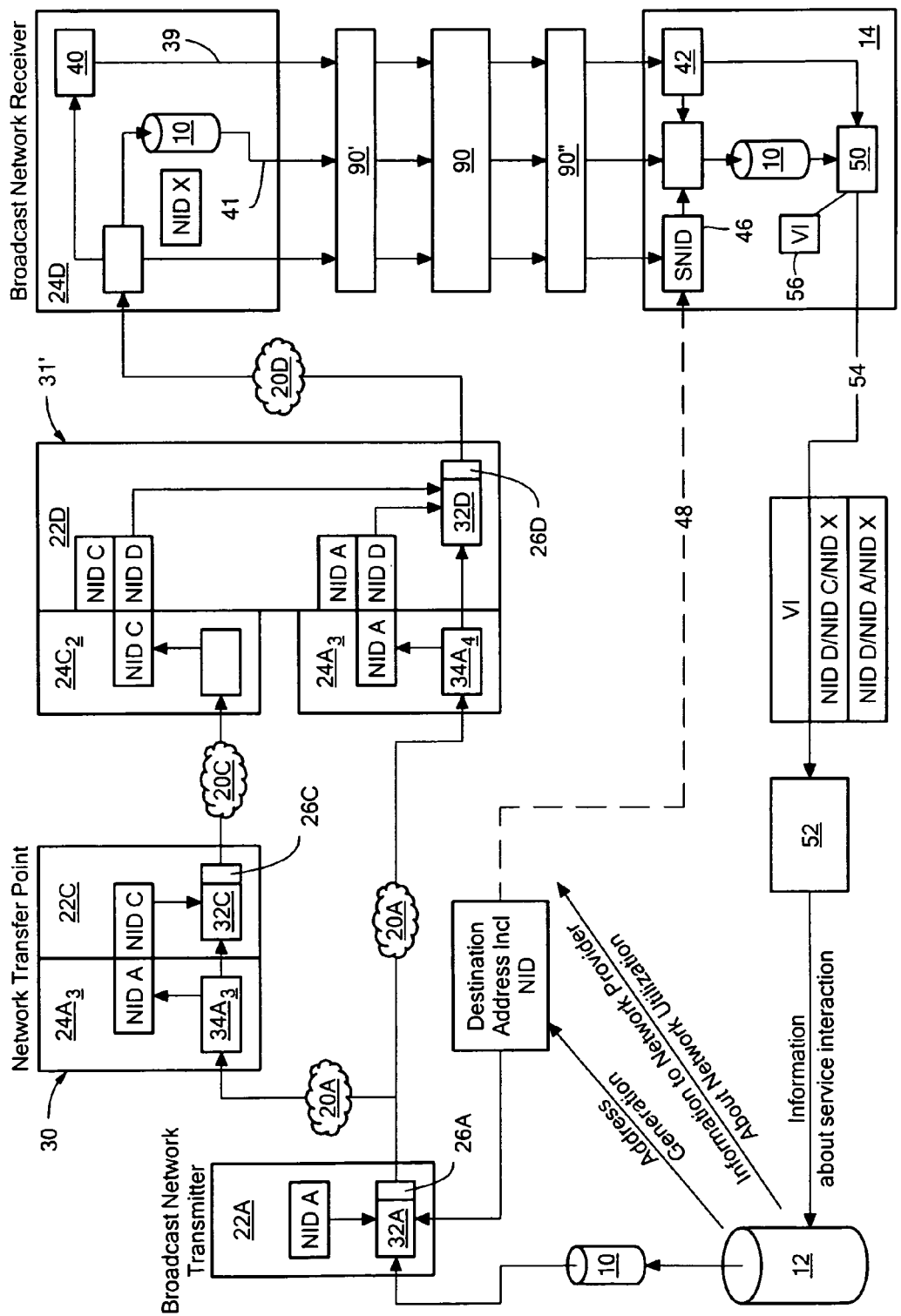

The drawings show:

FIG. 1: a schematic drawing of a first example of a network system comprising broadcast networks;

FIG. 2: a first embodiment example of a method in accordance with the present invention according to FIG. 1;

FIG. 3: a second embodiment example of a method in accordance with the present invention according to FIG. 1;

FIG. 4: a third embodiment example of a method in accordance with the present invention according to FIG. 1;

FIG. 5: a fourth embodiment example of a method in accordance with the present invention according to FIG. 1;

FIG. 6: a fifth embodiment example of a method in accordance with the present invention according to FIG. 1;

FIG. 7: a sixth embodiment example of a method in accordance with the present invention according to FIG. 1;

FIG. 8: a schematic drawing of a second example of a network system comprising broadcast networks;

FIG. 9: a seventh embodiment example of a method in accordance with the present invention according to FIG. 8;

FIG. 10: an eighth embodiment example of a method in accordance with the present invention according to FIG. 8;

FIG. 11: a schematic drawing of a third example of a network system comprising broadcast networks;

FIG. 12: a ninth embodiment example of a method in accordance with the present invention according to FIG. 11;

FIG. 13: a schematic drawing of a fourth example of a network system comprising broadcast networks;

FIG. 14: a ninth embodiment example of a method in accordance with the present invention according to FIG. 11; and FIG. 15: an eleventh embodiment example of a method in accordance with the present invention with a 'virtual' network;

A transmission of a user data record 10 of an owner 12 of the user data to a user station 14 of the user data 10, for instance to the user stations $14_1$ to $14_4$ in FIG. 1, is, in accordance with the invention, carried out via a first example of a network system 16 comprising several broadcast networks 20 where in each case a transmitter station 22 normally interacts with a plurality of receiver stations 24.

For instance a first broadcast network 20A, as shown in FIG. 1, comprises the transmitter station 22A, in which user data record 10 is transformed into a broadcast data record 26A corresponding to the communication protocol provided for the broadcast network 20A, that is then transmitted via the first broadcast network 20A from the transmitter station 22A to the receiver stations 24A.

In doing so $24A_1$, one of the receiver stations, is assigned to a user station $14_1$, to which the user data record 10 incorporated in the broadcast data record 26A is made available directly or indirectly.

Other receiver stations, for instance receiver station $24A_2$ are not assigned to a user, but part of a network transition station 28, in which the broadcast data record 26A is altered to a broadcast data record 26B and then transmitted from the transmitter station 22B of the second broadcast network 20B to one of its receiver stations 24B.

In doing so the receiver station 24B is assigned to the user station $14_2$, to which the user data record 10 incorporated in the broadcast data record 26B is made available directly or indirectly.

Another receiver station of the first broadcast network 20A, for instance receiver station $24A_3$ is part of another network transition station 30, in which the broadcast data record 26A is altered to a broadcast data record 26C and then transmitted from the transmitter station 22C of the third broadcast network 20C to one of its receiver stations 24C.

Likewise the receiver station $24C_2$ on its part is not assigned to a user station 14, but part of another network transition station 31, in which the broadcast data record 26C is altered to a broadcast data record 26D and then transmitted from the transmitter station 22D of the fourth broadcast network 20D to the receiver stations 24D, which on its part is assigned directly or indirectly to user station $14_4$, to which the user data record 10 incorporated in the broadcast data record 26D is also made available directly or indirectly.

Since broadcast networks such as broadcast network 20A, 20B, 20C, and 20D do not feature any feedback concerning the receiver stations 24, to which the broadcast data records 26 are transmitted, it is not possible to retrace via which of the broadcast networks 20A, 20B, 20C, or 20D the user data record has gotten to the appropriate user stations $14_1$ to $14_4$.

Therefore the broadcast networks 20A, 20B, 20C, and 20D of the network system in accordance with the invention are characterized as unidirectional networks.

This problem of the broadcast networks 20A to 20D is solved by the present invention as described by means of several embodiment examples in the following, whereas, for simplification of the presentation of the invention, it is acted on the assumption of a configuration, in which the transmission of the user data record 10 to user station $14_2$ is carried out via broadcast network 20A and broadcast network 20B as shown in FIG. 1.

For the transmission of user data record 10 via the other paths of the initially shown network system 16 analogue circumstances arise at analogue application of the details on the discrete embodiments hereinafter.

The first embodiment of a solution in accordance with the present invention as shown in FIG. 2 provides, that the user data record 10 is transformed to the broadcast data record 26A in the transmitter station 22A of the first broadcast network 20A by application of the communication protocol assigned to broadcast network 20A, where the transmitter 32A records a network identification NID A in the broadcast data record 26A, which therefore is also transmitted with the broadcast data record 26A.

In receiver station $24A_2$ of the first broadcast network 20A, which is part of the network transition station 28, a receiver 34 removes NID A from broadcast data record 26A, since the transmission via the first broadcast network 20A is completed.

Furthermore broadcast data record 26A is transferred to a transmitter 32B of broadcast network 20B, which at least modifies broadcast data record 26A to that effect, that network identification NID B is recorded in place of network identification NID A and which then transmits the broadcast data record 26B to the receiver station of the second broadcast network 20B.

Broadcast data record 26B received from a receiver 34B in receiver station 24B still contains the network identification NID B and this is extracted by receiver 34B, since it is a receiver of the last used broadcast network 20B, and directly or indirectly transferred to user station $14_2$ via a path 39 or for instance stored in a storage 40 in receiver station 24B before forwarding.

Simultaneously receiver 34B extracts user data record 10 from broadcast data record 26B and, in case of the first embodiment according FIG. 2, forwards it directly via a path 41 to user station $14_2$. At the receiver station $14_2$ a verification for release is carried out in a layer 42. For this the network identification NID B extracted by receiver 34B and stored in storage 40 is forwarded to layer 42 which compares it in a filter 44 with a predetermined network identification SNID as a setpoint, which for instance is stored in a setpoint storage 46.

For instance the setpoint network identification SNID can be transmitted via the broadcast network 20A and 20B prior to the transmission of user data record 10, where receiver 34B in receiver station 24B extracts the setpoint network identification SNID and forwards it to the user station $14_2$, which then stores it in the setpoint storage 46.

Supposably the setpoint network identification SNID can be stored in the setpoint storage 46 via a separate path.

Additionally the verification for release in layer 42 can be extended, for instance through verification of the receiver address of receiver 34B and comparison with a predetermined receiver address given as setpoint.

In case of a positive verification, meaning at least the setpoin network identification SNID corresponds to the network identification NID B, the user data record 10 is released for access from user station $14_2$.

In the most simple case of the solution in accordance with the present invention arbitrary access is enabled at user station $14_2$ after release of user data record 10.

This can be realized for all user stations $14_1$ to $14_4$, that are equipped with layer 42 for release verification. In this case the access to user data record 10 can be prohibited at user stations $14_1$, $14_4$, and $14_4$ by realization, that the network identification extracted in the appropriate receiver stations $24A_1$, 24C and 24D during verification for release does not correspond to NID B.

Furthermore a layer 50 is assigned to user station $14_2$ for detection of access to user data record 10, to which also the network identification NID B is made available.

Layer 50 detects access to user data record 10 and, in case of access to user data record 10, reports network identification NID B to a compilation station 52, which is connected with layer 50 via a transmission path 54.

Furthermore layer 50 reports to compilation station 52 not only the network identification NID B during access detection but also usage information UI. For instance such usage information UI is also stored in a storage 42 in user station $14_2$.

Such usage information UI comprises information about the manner of usage of user data record 10. Preferentially usage information UI also comprises user information, meaning personal information about the user, in particular a user identification and information about user activities concerning user data record 10.

An application example of the method in accordance with the invention could be the provision and billing of videos in video-on-demand services or virtual video libraries. In this case the videos are transmitted via network system 16 as user data record 10, whereas the interest of the owners of the respective broadcast networks 20A to 20D consists in a participation in the revenue gained with those videos in compensation for transmission capacities made available.

Since now layer 50 for access detection reports the last network identification NID B to compilation station 52 at access to user data record 10, i.e. the video in this case, compilation station 52 is enabled to retrace which broadcast networks 20 have been involved in the transmission of user data record 10 in form of this video through the network identification NID B, since the structure of network system 16 as shown in FIG. 1 is known to the compilation station.

Would, for instance, network identification NID C be transmitted to compilation station 52, then the compilation station 52 would be able to recognize that the third broadcast network 20C was the last broadcast network involved in the transmission of user data record 10 and therefore determine, that in addition the first broadcast network 20A was involved in the transmission, too.

Would, for instance, network identification NID D be transmitted to compilation station 52, then the compilation station 52 would be able, due to the structure of network system 16, to recognize that not only the fourth broadcast network 20D was involved in the transmission of user data record 10, but also the third broadcast network 20C and the first broadcast network 20A in addition.

Preferentially the path, which goes from compilation station 52 to user station $14_2$ anyway, is used as transmission path 52 to transfer for instance the key for the enciphered video information incorporated in user data record 10 in a video service and to ensure payment for utilization at the same time.

In addition the compilation station can communicate with the owner 12 of the user data record 10 to ensure the billing of the video-on-demand service and, moreover, it can communicate with the owners of the broadcast networks 20 to ensure their compensation, too.

In a second embodiment of a method in accordance with the invention, shown in FIG. 3, the same reference numerals are used for the same components, so that concerning the description of that it is referred to the remarks for the first embodiment textually.

Unlike the first embodiment user data record 10 is fed into transmitter station 22a of the first broadcast network 20A collaterally via a supply network 60. Therefore user data record 10 is already converted to a network data record 66 by a transmitter 62 of the supply network 60 according to a communication protocol of supply network 60, which for instance might be a standard protocol, and is transmitted to a receiver of supply network 60, which is accommodated in the transmitter station 22A of broadcast network 20A, via the transmitter 62 of the supply network 60, network data record 66 then is passed to transmitter 32A by receiver 64.

A protocol converter 68, which transforms the network data record 66 to the broadcast data record 20A according to the communication protocol of the first broadcast network 20A, follows receiver 64.

Incidentally the transmission to receiver station 24B of broadcast network 20B proceeds similarly as described in connection with the first embodiment and the extract of network identification NID B is carried out by the receiver 34B similarly.

A protocol converter 69, which re-transforms the broadcast data record 26B to the network data record 20A so that it is available in the standard protocol again, follows receiver 34B.

The difference to the first embodiment consists therein, that the receiver 34B of the receiver station 24 does not make the user data record available directly, but as network data record in standard protocol format.

A transmission is carried out to the user station $14_2$, which is furnished with a converter 70 to build user data record 10 from network data record 66, in this format.

To be able now to transmit the last network identification NID B stored in storage 40 likewise in the standard protocol format, the receiver station 24B is furnished with a transmitter 72, which is capable of transmitting the last network identification NID B in standard protocol format to the converter 70, that then transforms it to the last network identification NID B in turn to make it available to filter 44 of layer 42, which operates similarly as described in the first embodiment.

In a third embodiment, shown in FIG. 4, that elements and measures of the method, which are identical with the preceding embodiments, are furnished with the same reference numerals, so that concerning the description of that it is referred to the remarks for the precedent embodiments textually.

Unlike the second embodiment an encapsulator 68', which transforms the network data record 66 to the broadcast data record 26A, is provided in place of the protocol converter 68.

Furthermore a decapsulator 69', which re-transforms broadcast data record to network data record 66, is provided in place of protocol converter 69.

Incidentally the third embodiment operates similarly to the second embodiment.

In a fourth embodiment, shown in FIG. 5, it is likewise textually referred to the remarks for the precedent embodiments with regard to the several elements and measures of the method.

Unlike the third embodiment in the fourth embodiment of the method in accordance with the invention a transmission of the network data record 66, available in the receiver station 24B of broadcast network 20B, is carried out collaterally by a transmitter 82 provided for network data record 66 in the receiver station 24B and a receiver 84 provided for network data record 66 in the user station $14_2$ via a user network 80.

Incidentally the fourth embodiment operates similarly to the second embodiment.

In a fifth embodiment, shown in FIG. 6, the supply network 60' is not operated on basis of the standard protocol but on basis of the Internet protocol, so that the transmitter 62' transmits a Internet data record 66' to receiver 64'.

The Internet data record 66' is then converted to the broadcast data record 26A by an encapsulator 68".

Similarly a decapsulator 69", which recovers the Internet data record 66' from the broadcast data record 26B, is provided in the receiver station 24B.

Furthermore a transmitter 72', which transfers network identification NID B to a converter operating Internet protocol based, is provided for transmission of network identification NID B.

In a sixth embodiment, shown in FIG. 7, it is textually referred to the remarks for the precedent embodiments insofar they are identical.

Unlike the fifth embodiment, shown in FIG. 6, a user network 80' is provided with a transmitter 82' for collateral transmission of the Internet data record 66' on the part of the receiver station 24B and a receiver 84' on the part of the user station $14_2$.

Incidentally the sixth embodiment operates similarly to the fifth embodiment.

It is possible to employ analogue or digital broadcast networks with an accordant alteration of the communication protocol in all broadcast networks 20 of network system 16.

A second example of a network system 16', shown in FIG. 8, includes the components explained in connection with the first embodiment similarly. Another receiver station $24A_4$ is provided additionally, which in this case is part of the network transition station 31', in which in addition to the transition of broadcast data record 26C to a broadcast data record 26D the reception of broadcast data record 26A und transition of it to broadcast data record 26D can take place, so that network 16' can either transmit broadcast data record 26A to network transition station 30' either via network transition station 30 to network transition station 30' or directly from transmitter station 22A to network transition station 31' without interposition of network transition station 30.

Therewith, as shown in FIG. 9, it can not ascertained on basis of the last network identification NID D in receiver station 24D, whether the transmission of the user data 10 to network transition station 31' has taken place directly from transmitter station 22A or via network transition station 30.

In the seventh embodiment of a method in accordance with the present invention as shown in FIG. 9 for this reason the broadcast data record 26D when transmitted in the fourth broadcast network 20D is not only furnished with the network identification of the fourth broadcast network 20D, namely NID D, but also with the precedent network identification NID C or NID A in addition, so that not only the network identification NID D extracted by receiver 34 but also the precedent network identification, namely NID C or NID A, is stored in storage 40.

Due to this additional information it is unambiguously comprehensible via which of the broadcast networks, namely 20A in combination with 20D or 20A in combination with 20C and 20D the user data record 10 has been transmitted.

Incidentally the seventh embodiment of the method in accordance with the invention operates similarly to the first embodiment according to FIG. 2, so that the same reference numerals are used for identical components concerning the explanation it is textually referred to the explanation of the first embodiment further on.

In an eighth embodiment of a method in accordance with the invention, shown in FIG. 10, alternatively to the seventh embodiment a varying network identification NID D1 or NID D2 is used when transmitting user data record 10 via broadcast network 20D depending on via which precedent broadcast network, namely broadcast network 20A or 20C, the user data record has been transmitted, so that on part of the receiver station 24D and therefore the user station $14_4$ the possibility exists to ascertain solely on basis of the last network identification NID D1 or NID D2 whether the user data record has been transmitted via broadcast networks 20A and 20D or broadcast network 20A combined with 20C and 20D.

Incidentically the eighth embodiment operates in similarly to the first embodiment according FIG. 2, so that the same reference numerals are used for all other components and it is textually referred to the explanations concerning the first embodiment.

In an ninth embodiment of a method in accordance with the invention, shown in FIGS. 11 and 12, similar to the previous eighth embodiment a varying network identification NID D1 or NID D2 is used when transmitting user data record 10 via broadcast network 20D depending on via which precedent broadcast network, namely broadcast network 20A or 20C, the user data record has been transmitted. Unlike the eighth embodiment these varying network identifications are used to generate varying broadcast data records 26D and 26D' for transmission into other broadcast networks, so that each in a receiver station 24D$_1$ of a network transition station 32 and in a receiver station 24D$_2$ of a network transition station 32' the broadcast data record is filtered and forwarded on the basis of the network identification appropriate to network 20E or 20F. This is particularly beneficial when 20D is a matter of broadcast network and these broadcast data records including the user data record are transmitted through different channels.

Incidentally also the ninth embodiment operates similarly to the first embodiment according FIG. 2, so that the same reference numerals are used for all other components and it is textually referred to the explanations concerning the first embodiment.

In an tenth embodiment of a method in accordance with the invention, shown in FIGS. 13 and 14, similar to the previous ninth embodiment a varying network identification NID D1 or NID D2 is used when transmitting user data record 10 via broadcast network 20D depending on via which precedent broadcast network, namely broadcast network 20A or 20C, the user data record has been transmitted. Unlike the ninth embodiment the varying network identification are used in th network transition station 31' to transmit the user data record through each diferrent networks 20D and 20D' into further networks 20E and 20F. This is in particular beneficial, when 20D and 20D' are matters of bi-directional networks or networks of different type and 20E and 20F are broadcast networks.

Incidentally also the tenth embodiment operates similarly to the first embodiment according FIG. 2, so that the same reference numerals are used for all other components and it is textually referred to the explanations concerning the first embodiment.

With regard to the demonstration of an eleventh embodiment, shown in FIG. 15, it is acted on the assumption of a constellation as in the eighth embodiment for instance. However, the method in accordance with the invention described in this example can be applied to all other previous embodiments. Unlike the eighth embodiment the receiver station 24D and the user station 14 are two discrete devices, which are also not connected with a physical network. The user data records' transfer from the receiver station 24D to the user station 14 is carried out through a physical data medium 90 such as for instance a floppy disk, a CD, a flash memory, or another, including future memory mediums. The user data record is transferred from receiver station to the physical data medium via a standard interface 90' such as a floppy disk drive, an optical drive, a USB interface, or another standard interface and transferred to the user station 14 via an appropriate interface 90" within the user station. In doing so the receiver station 24D creates another network identification X for identification of this 'virtual' network in form of transmission via a physical data medium and which is transmitted to compilation station 52 together with the last network identification or with or with a composed network identification as in the eighth embodiment.

Due to this additional information it is unambiguously comprehensible via which of the broadcast networks and which receiver station user data record 10 has been transmitted to the user station.

Incidentally the eleventh embodiment in accordance with the invention operates similarly to the first embodiment according FIG. 2, so that the same reference numerals are used for the same components and concerning the explanations it is textually referred to the explanations concerning the first embodiment.

The invention claimed is:

1. Method for transmission of a user data record to a user station comprising the following steps:

Transmitting the user data record as a broadcast data record via a network system, said network system comprising at least two networks capable of data transmission, of which at least one network is designed as a broadcast network, in which at least one network identification of the broadcast network used for transmission is added to the broadcast data record prior to transmission, wherein said at least one network identification comprises a last added network identification, wherein, in the event that said at least one network identification consists of a single network identification, said single network identification is said last added network identification, and wherein, in the event that said at least one network identification comprises a plurality of network identifications comprising said last added network identification and previous network identifications, said last added network identification is the network identification that is most recently added;

Extracting from the broadcast data record at least the last added network identification to the broadcast data record during reception of the broadcast data record; and Forwarding at least the last added network identification and the user data record to the user station for consideration of at least the last added network identification in connection with the usage of the user data record.

2. Method according to claim 1, wherein the network system comprises at least two consecutive and/or parallel broadcast networks capable of data transmission.

3. Method according to claim 1, wherein consideration of the last added network identification in connection with the usage of the user data record includes a comparison of the last added network identification with a network identification predetermined to the user station for decision on release of the user data record for the user station.

4. Method according to claim 3, wherein a decision on release of the user data record is positive when the last added network identification corresponds to the predetermined network identification.

5. Method according to claim 3, wherein a decision on release of the user data record is carried out by a filter operation inserted before access to the user data record.

6. Method according to claim 3, wherein the predetermined network identification is transmitted via the network system.

7. Method according to claim 3, wherein the predetermined network identification is transmitted via a path separated from the network system.

8. Method according to claim 1, wherein, in addition to the last added network identification, at least one other precedent network identification is extracted from the broadcast data record and is forwarded to the user station.

9. Method according to claim 1, wherein the last added network identification allows the identification of at least one precedent broadcast network.

10. Method according to claim 1, wherein the forwarding of at least the last added network identification to a user station includes the transmission of it as independent information.

11. Method according to claim 10, wherein the forwarding of at least the last added network identification is carried out via a separate transmission path.

12. Method according to claim 10, wherein the forwarding of at least the last added network identification is carried out via a transmission path for the user data record.

13. Method according to claim 1, wherein consideration of at least the last added network identification in connection with the usage of the user data record includes the forwarding of at least the last added network identification to a compilation station for usage of the user data record in case of access to the user data record by user station.

14. Method according to claim 13, wherein the forwarding of at least the last added network identification to the compilation station is carried out together with usage information from the user station.

15. Method according to claim 14, wherein the usage information comprises information about the user data record and/or user information.

16. Method according to claim 15, wherein the user information is a user identification and/or that the user information includes information on user activities.

17. Method according to claim 13, wherein the forwarding of at least the last added network identification to the compilation station is carried out via a transmission path separated from the network system.

18. Method according to claim 13, wherein the compilation station exploits at least the last added network identification and the usage information.

19. Method according to claim 13, wherein the compilation station forwards at least the last added network identification together with at least parts of the usage information.

20. Method according to claim 13, wherein the compilation station communicates with the user station concerning the usage of the user data record.

21. Method according to claim 1, wherein consideration of the last added network identification is used by a subsequent network transition station for generation of a broadcast data record and wherein transmission in the network belonging to that network transition station depends on it, where the dependence might be predefined.

22. Method according to claim 1, wherein at least the last added network identification is used for identification in a network transition station for transmission into different networks of the network system starting from that network transition station and that the transmission into the respective network depends on it, where the dependence might be predefined.

23. Method according to claim 1, wherein at least one of the networks is a bi-directional network.

24. Method according to claim 17, wherein the transmission path is a network in accordance with the TCP/IP standard.

25. Method according to claim 1, wherein at least one of the networks is a digital broadcast network.

26. Method according to claim 1, wherein at least one of the networks is a digital broadcast network in accordance with the DVB standard.

27. Method according to claim 1, wherein the user station is a physically separate device from a user's receiver station and the user station and the user's receiver station are also not connected to one another via a physical network, where the user data record is transferred to the user station via a storage medium and at least one interface intended therefor in the user's receiver station and the user station.

28. Method according to claim 27, wherein the storage medium is a flash memory.

29. Method according to claim 27 or 28, wherein the at least one interface is a USB interface.

* * * * *